United States Patent [19]
Hanson et al.

[11] Patent Number: 5,024,460
[45] Date of Patent: Jun. 18, 1991

[54] OUTPUT FILTER AND METHOD FOR ON/OFF SEMI-ACTIVE SUSPENSION CONTROL

[75] Inventors: Reed D. Hanson, Dayton, Ohio; Scott T. Radcliffe, West Lafayette, Ind.

[73] Assignee: General Motors Corporation, Detroit, Mich.

[21] Appl. No.: 454,309

[22] Filed: Dec. 26, 1989

[51] Int. Cl.$^5$ .............................................. B60G 17/04
[52] U.S. Cl. ................................................... 280/707
[58] Field of Search ......................................... 280/707

[56] References Cited

U.S. PATENT DOCUMENTS

| | | | |
|---|---|---|---|
| 4,717,173 | 1/1988 | Sugasawa et al. | 280/707 |
| 4,730,843 | 3/1988 | Tanaka et al. | 280/707 |
| 4,763,222 | 8/1988 | Heaston et al. | 280/707 |
| 4,789,935 | 12/1988 | Buma et al. | 280/707 |

Primary Examiner—Kenneth R. Rice
Attorney, Agent, or Firm—Robert M. Sigler

[57] ABSTRACT

In a suspension control comprising a damper having a valve switchable at frequencies within a desired activation frequency range between high and low damping modes, an unfiltered damper signal is repeatedly derived from vehicle suspension related variables at a range significantly greater than the desired activation frequency range. An output filter derives a filtered damper signal from each successive binary actuator force signal by (1) resetting a timer each time the unfiltered damper signal changes value, (2) causing the filtered damper signal to be the same value as the unfiltered damper signal while the timer is inactive, and (3) maintaining the filtered damper signal value unchanged while the timer is active. The damper is controlled in response to the filtered damper signal, whereby unnecessary high frequency switching of the valve is reduced but the damper responds without unnecessary delay to signals within the desired activation frequency range.

4 Claims, 4 Drawing Sheets

DAMPING FORCE-VELOCITY DIAGRAM

OUTPUT FILTER AND METHOD FOR ON/OFF SEMI-ACTIVE SUSPENSION CONTROL

BACKGROUND OF THE INVENTION

This invention relates to an on/off semi-active suspension control for a wheeled vehicle having a body suspended on an unsprung, road contacting wheel. An active suspension includes an actuator capable of modifying the force between the vehicle body and wheel in response to a control in real time so as to produce a desired suspension behavior. A semi-active suspension is similar but uses an actuator which provides only damping or dissipative forces so that the suspension generates its own force. In addition, an on/off damper has only two operating modes with fixed force/velocity curves: a first mode having a high damping force and a second mode having a low damping force. Such a damper uses a valve capable of switching the damper between its first and second operating modes at frequencies at least twice the resonant wheel vibration frequency to achieve real time control of wheel as well as body motions.

An on/off, semi-active suspension control has been described, at least theoretically, in the prior art in the paper entitled "The Experimental Performance of an 'on-off' active damper" by E. J. Krasnicki in the Proceedings of the 51st Shock and Vibration Symposium in San Diego, Calif., in October 1980. This suspension is a modification of the semi-active suspension control previously described by Dean Karnopp et.al. in "Vibration Control Using Semi-Active Force Generators", ASME Paper No. 73-DET-122, June, 1974 and related to the disclosure of U.S. Pat. No. 3,807,678, issued Apr. 30, 1974 to Karnopp et.al. The suspension as described by Krasnicki includes a control which repeatedly calculates a desired actuator force and determines if the power generated by this force would be active or dissipative. If the power would be active, which a damper cannot provide, the control actuates the valve to the second mode of operation to provide minimum (zero) damping. If the power would be dissipative, the control actuates the valve to the first mode of operation to provide high damping.

An improved on/off semi-active suspension control is described in the copending patent application G-5,053, filed Nov. 2, 1989 by Kamal N. Majeed and assigned to the assignee of this patent application. The disclosure of that patent application describes such a control including an on/off damper which is switchable between its high and low damping modes at a frequency at least twice the resonant wheel vibration frequency and preferably higher, perhaps up to 50 Hz. However, response of the damper at frequencies higher than 50 Hz is not necessary for suspension control and would only add to the cost of the system. The control described is embodied in a digital processing system which completes a cycle and provides a new output signal for each on/off damper once every 1 millisecond. Since the damper signal is a single digital bit for selection of high or low damping mode, this corresponds to a maximum output frequency of 500 Hz. It is not desirable to apply a standard low pass filter, which would introduce phase delay, since a fast transient response to the initiation of a large low frequency input is desired for good system response to major road perturbations or vehicle maneuvers. However, on a comparatively smooth road, there is still a significant low amplitude input at high frequencies which can produce a high frequency damper signal (100–500 Hz). This high frequency damper signal, if provided to the damper unprocessed, would result in no useful suspension performance improvement but might cause unnecessary damper valve actuation which could shorten its useful life. Therefore, it is desirable in some instances to filter this signal in a way that limits its frequency while still providing fast transient response.

SUMMARY OF THE INVENTION

The suspension control of this invention provides a filter for the damper signal which prevents the damper valve from switching damping modes more than once within a predetermined time period. However, a change in value in the damper signal which has been unchanged for the predetermined time is allowed to immediately switch the damper valve. Since the signals involved are binary, or two valued, signals, this prevents switching at high frequencies but will pass without delay the initiation of a change which does not originate in a high frequency signal.

The invention is thus a suspension control for a vehicle having a body and a road contacting wheel connected by a damper effective to apply a damping force therebetween. The damper includes apparatus including a valve switchable in response to a binary filtered damper signal at frequencies within a desired activation frequency range between a first mode of operation characterized by a low damping force, in response to a first value of the filtered damper signal, and a second mode of operation having a high damping force, in response to a second value of the filtered damper signal.

The suspension control comprises first means effective to repeatedly derive from one or more sensed vehicle suspension related operating variables, at a rate significantly greater than the desired activation frequency range, a binary unfiltered damper signal comprising a first value or a second value and a timer active for a predetermined time after a reset and otherwise inactive. The suspension control further comprises filter apparatus effective to derive the filtered damper signal from each successive binary actuator force signal by (1) resetting the timer each time the unfiltered damper signal changes value, (2) causing the filtered damper signal to be the same value as the unfiltered damper signal while the timer is inactive, and (3) maintaining the filtered damper signal value unchanged while the timer is active. Thus, unnecessary high frequency switching of the valve is reduced but the damper responds without unnecessary delay to signals within the desired activation frequency range.

Further details and advantages of this invention will be apparent from the accompanying drawings and following description of a preferred embodiment.

DESCRIPTION OF THE PREFERRED EMBODIMENT

Figure 1:
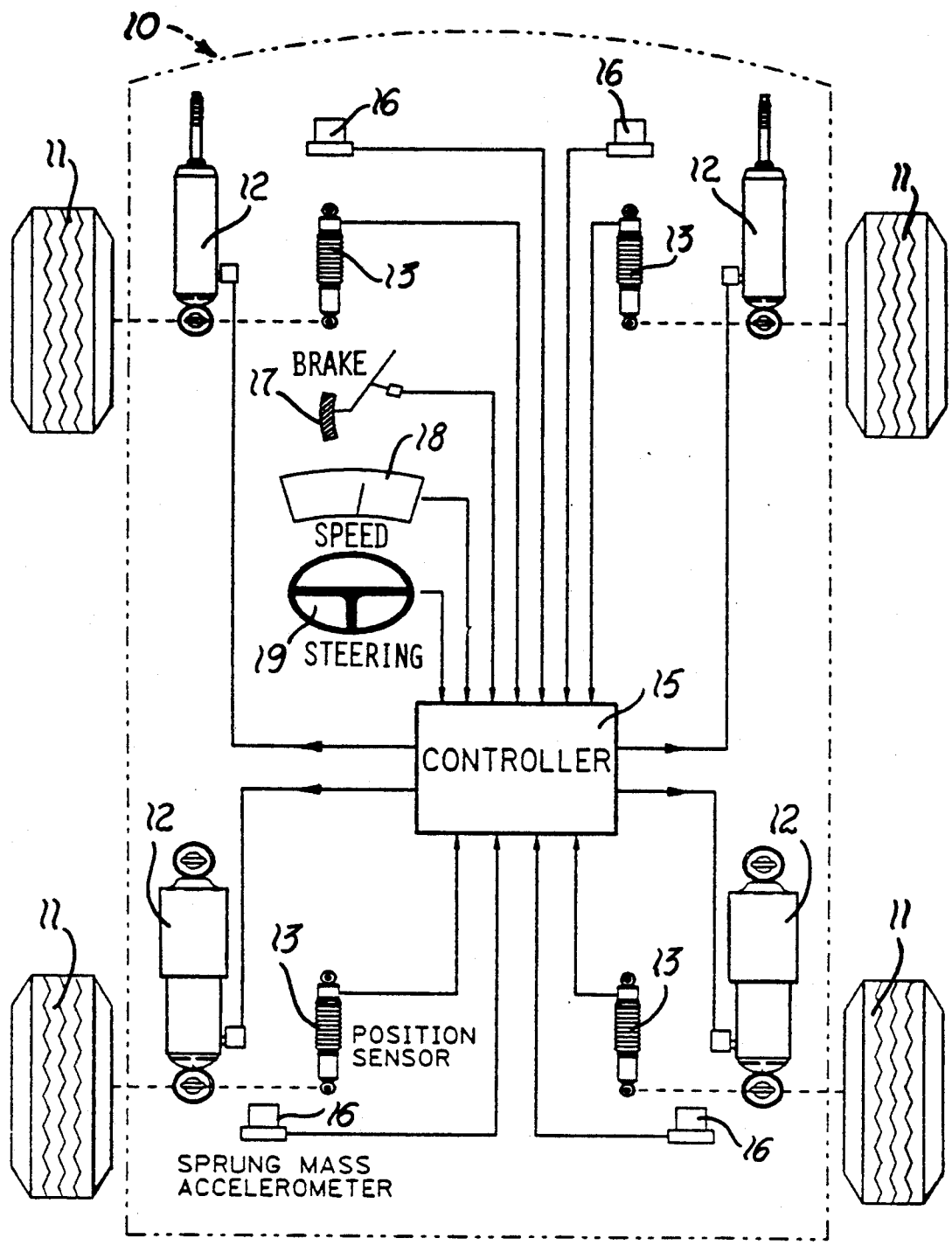
FIG. 1 is a schematic diagram of a motor vehicle with a suspension control according to this invention.

FIG. 1 shows a schematic diagram of a motor vehicle with a suspension control according to the invention. The vehicle has a body 10 comprising a sprung mass. Body 10 is essentially rectangular in shape and is supported on a wheel 11 at suspension points comprising each of its corners by suspension apparatus 12 comprising a weight bearing suspension spring in parallel with a suspension actuator connected to exert a controllable force in parallel with the spring between the body 10 and wheel 11 at that suspension point. The suspension actuator may be a variable damper of the on/off type, such as damper 20 described more particularly at a later point in this description with reference to FIGS. 2 and 3. In FIG. 1, apparatus 12 is shown as a damper for simplicity, although it is understood that a spring, such as a standard coil suspension spring, is connected in parallel with it. Suspension apparatus 12 further includes an axle for rotatably supporting wheel 11 and such other suspension components, such as control arms, as are required for and comprise the unsprung mass of a standard vehicle suspension. These components are also omitted from separate view in FIG. 1 for simplicity.

At each corner of body 10, a suspension position sensor 13 is connected between the body and unsprung mass to measure the relative vertical position thereof and generate an output vertical suspension position signal for input to a controller 15. An LVDT position sensor is suitable for this purpose; and such a sensor is available from, among others, Nartron Corporation of Reed City, MI. The relative vertical suspension position signal may be differentiated to produce a relative body/wheel vertical velocity signal. An acceleration sensor 16 is also positioned at each corner of body 10; and sensor 16 generates an absolute vertical acceleration signal of that corner of body 10 for input to controller 15. For each corner of the vehicle, integration of the absolute vertical acceleration signal from sensor 16 by controller 15 provides a vertical body corner velocity signal. From the difference of these signals, controller 15 is able to compute the vertical wheel velocity. An absolute acceleration sensor suitable for use in this system is made by First Inertia Corporation of Hampshire, England. Acceleration sensors 16 should be mounted with care so as to minimize cross-axis sensitivity which might contaminate the vertical acceleration signal with horizontal acceleration information. Additional signals which may optionally be generated are a vehicle deceleration or braking signal by brake sensor 17, a vehicle speed signal from vehicle speed sensor 18 and a vehicle steering signal from vehicle steering sensor 19. These latter signals are not required for the suspension control of this invention and will not be further describe. However, many examples of such sensors and their uses for suspension control are known in the prior art.

Figures 2, 3:
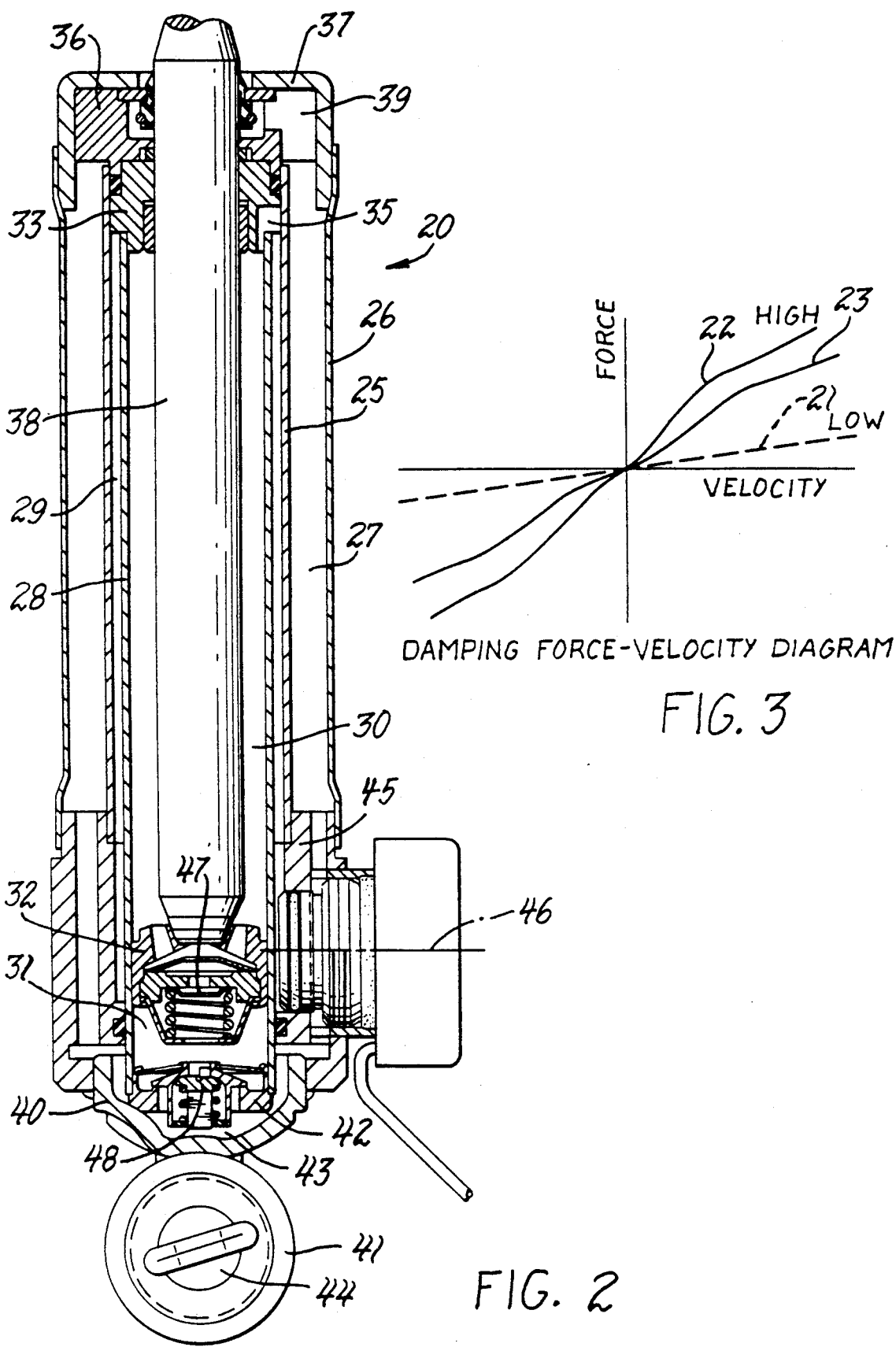
FIG. 2 is a cross sectional view of a variable damper for use as a suspension actuator in the suspension control of the vehicle of FIG. 1.
FIG. 3 is a typical set of force/velocity curves for the variable damper of FIG. 2.

Damper 20, shown in FIG. 2, is a dual force/velocity curve, discrete variable damper of the type in which a standard vehicle shock or strut is modified by the addition of a bypass passage which can be opened or closed by a bypass valve capable of high frequency operation for real time, on/off damping control. With the bypass valve open, the damper has a low damping force curve such as curve 21 in FIG. 3; and, with the bypass valve closed, the damper has a high damping force curve, such as curve 22 of FIG. 3.

Referring to FIG. 2, variable damper 20 comprises inner and outer reservoir tubes 25 and 26, respectively, defining therebetween a reservoir 27. A central pressure cylinder 28 is located axially within inner reservoir tube 25 and defines with it an annular passage 29. The space within central pressure cylinder 28 is divided into upper and lower chambers 30 and 31, respectively, by a piston 32 sealingly disposed for axial movement. Upper chamber 30 and annular passage 29 are bounded at their upper ends by a pressure closure member 33 which provides relatively unrestricted communication between chamber 30 and passage 29 through an opening 35. Reservoir 27 is bounded at its upper end by a reservoir closure member 36 and an upper end cap 37.

Piston 32 is attached to the lower end of a reciprocating piston rod 38, which extends upward through openings in members 33, 36 and end cap 37 for attachment to a corner of body 10 in the manner normal for shocks or struts. High pressure and lag seals are provided in members 33 and 36, respectively; and a lower pressure seal is provided in end cap 37 around piston rod 38. Since there will be some fluid leakage past the high pressure and lag seals, a return passage 39 is provided through reservoir closure member 36 to reservoir 27.

The lower end of damper 20 comprises an outer closure cap 40 rigidly attached to reservoir tubes 25 and 26 and pressure cylinder 28 and connected in the normal manner to a member of the unsprung mass of the vehicle such as a control arm 44 by means of a standard fitting 41. An inner closure cap 42 closes the bottom of lower chamber 31 and defines a lower reservoir chamber 43 between closure caps 40 and 42 which is open to reservoir 27. A lower closure member 45 bounds the lower end of reservoir 27 and annular passage 29 and further provides mounting for an electrically activated bypass valve apparatus 46, which controls communication between annular passage 29 and reservoir 27 by way of lower reservoir chamber 43 in response to a signal from controller 15. Since actuator 20 is to respond to the control in real time to control wheel as well as body movements, valve 46 must be capable of moving between its closed and open positions at a frequency significantly greater than the resonant wheel (unsprung mass) vibration frequency: at least twice this frequency and preferably higher. For example, a typical resonant wheel vibration frequency is 12 Hz. Thus, the valve of damper 20 must respond at least up to 24 Hz and preferably up to 50 Hz. A valve suitable for use as valve 46 is a solenoid cartridge valve such as the Waterman Hydraulics (R) Series 12, a normally closed valve with a 5 gpm capability.

Piston 32 contains standard shock piston valve and orifice apparatus 47 including one or more throttling orifices, a rebound blowoff valve and a compression check valve. Inner closure cap 42 contains standard shock base valve apparatus 48 including one or more throttling orifices, a compression blowoff valve and a rebound check valve. These valves and orifices provide compression and rebound damping force characteristics in the normal manner well known in the prior art of shocks and struts for motor vehicles and, with bypass valve apparatus 46 closed to prevent direct communication between annular passage 29 and reservoir 27, produce the high damping force curve 22 of FIG. 3. Typically, in extension or rebound, upward movement of piston 32 causes throttled flow through the orifices and, at high velocity, the blowoff valve of piston 32. This flow is equal to the decrease in the annular volume of upper chamber 30; and a flow equal to the displaced rod (38) volume is drawn into lower chamber 31 from reservoir 27 in a relatively unrestricted manner through the check valve of base valve apparatus 48. Likewise, in compression, downward movement of piston 32 drives fluid out of lower chamber 31 in a relatively unrestricted manner through the check valve of piston valve and orifice apparatus 47. This flow is equal to the increase in the annular volume of upper chamber 30; but the volume of lower chamber 30 is further decreasing by the displaced rod (38) volume. Therefore, a throttled flow equal to the displaced rod volume is driven out of lower chamber 30 through the orifices and, at high velocity, the blowoff valve of base valve apparatus 48.

With bypass valve apparatus 46 open to allow direct communication between annular passage 29 and reservoir 27, however, the apparatus will produce the low damping force curve 21 of FIG. 3. In extension, the displaced fluid from upper chamber 30 finds a comparatively unrestricted flow path through the open valve of apparatus 46 into reservoir 27; and the full increase in volume of lower chamber 30 flows relatively unrestricted from reservoir 27 through the check valve of base valve assembly 48 into lower chamber 30. In compression, a fluid flow equal to the full decrease in volume of lower chamber 31 finds relatively unrestricted passage through the check valve of piston valve and orifice assembly 47; and a flow equal to the displaced rod (38) volume finds relatively unrestricted passage from upper chamber 30 through the open valve of apparatus 46 into reservoir 27.

Figure 4:
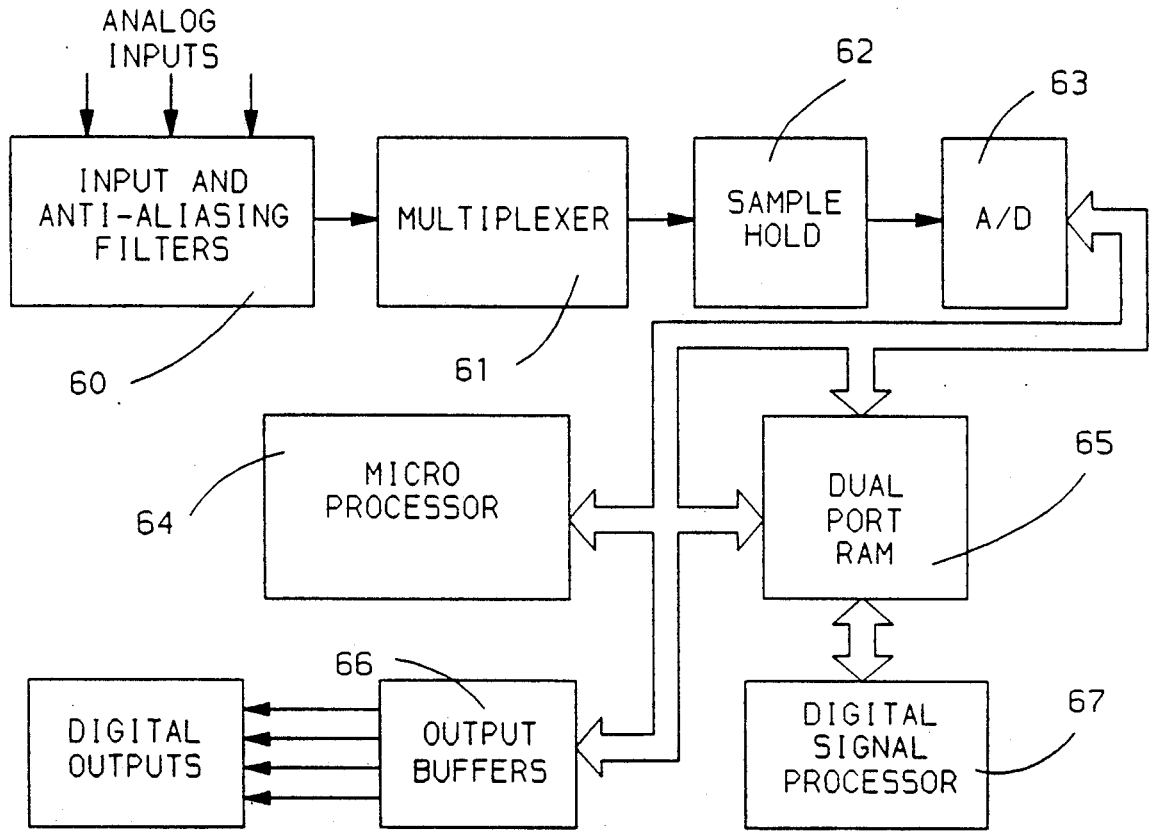
FIG. 4 is a block diagram of a controller for use in the suspension control of the vehicle of FIG. 1.

The hardware configuration of controller 15 is shown in schematic and block diagram form in FIG. 4. The analog inputs from sensors 13, 16, and 17-19 are processed in input apparatus 60, which includes sensor interface circuitry, anti-aliasing filters and any additional analog signal processing such as the differentiating of the relative position signals from sensors 13 to form relative velocity signals. The integration of the body corner acceleration signals from sensors 16 may also be performed in this circuitry but is preferably performed in software within the digital circuitry to be described.

With regard to the input signals, it should be noted that the control has been found to work well, at least in the case of an on/off damping actuator, with a loop frequency of 1 KHz, which means that, to avoid aliasing distortion, the input signals should be low pass filtered to avoid any significant input signals at frequencies above 500 Hz. The differentiator, especially, needs to be designed with care, since differentiation, by nature, accentuates the high frequencies in the signal and heavy filtering tends to introduce phase delays which can slow system response.

The processed and filtered input signals are read into the system by a multiplexer 61, which provides each signal, in turn, to a sample/hold apparatus 62 and an analog/digital (A/D) converter 63. The signals can be pipelined through this portion of the apparatus to speed data read-in. The output of the A/D apparatus is provided to an eight bit data bus connected also to a microprocessor 64, RAM 65 and output buffers 66. A separate 16 bit data bus connects dual port RAM 65 to a digital signal processor (DSP) 67. Microprocessor 64, which may, for example, be one of the 68HC11 family made by the Motorola (R) Corporation, contains the basic system operating software and controls the data handling and decision making tasks of the control; while DSP 67, which may be a TMS320C15 or TMS320C17 made by Texas Instruments (R) Corporation, is optimized for mathematical computations such as multiplication, which would greatly slow down a general purpose microprocessor. Such multiplications are used both in the solution of the control equations and in a digital integration routine. The output buffers 66 interface the digital processing apparatus with the four actuators 12 and may further include digital low pass filtering to prevent output of signals at frequencies higher than those to which the actuators need respond. For the embodiment shown, output buffers 66 need only be digital buffers, since the output control signals to the actuators are single bit digital signals selecting high or low damping. In a continuous active or semi-active system, however, suitable digital/analog conversion apparatus would be inserted before the output buffers. The apparatus shown is that used for the original reduction to practice of the system described herein; and a more complete description can be found in the paper "Dual Processor Automotive Controller" by Kamal N. Majeed, published in the proceedings of the IEEE/Applications of Automotive Electronics, Dearborn, Michigan, Oct. 19, 1988. However, cost savings may be achieved in a mass produced system by the replacement of the dual port RAM 65 with ordinary RAM and the use of a software controlled interface bus between the microprocessor and DSP and a three line serial interface for input and output, as known to those skilled in the art of microcomputer system design.

The control implemented in controller 15 is similar to that described in the aforementioned patent application G-5,053. State equations based on a suspension model are solved during each program to provide a desired force at each wheel. For each such force, it is determined whether this force would require active power supplied to the damper or would generate dissipative power. This may be accomplished, for example, by comparing the sign of the desired force and the sign of the relative body/wheel velocity. If they are the same, active power is required; and this is impossible with a damper. Therefore, the unfiltered damper signal is set at its first value which, if applied to the damper, would produce minimum damping. If the signs are opposite, the power will be dissipative; and the unfiltered damper signal is set according to a threshold reference for the desired force. If the desired force does not exceed the threshold reference, the unfiltered damper signal is set to its first value for minimum damping. However, if the desired force exceeds the threshold reference, the unfiltered signal is set to its second value which, if applied to the damper, would produce the maximum damping condition.

The control program derives an unfiltered damper signal of one bit for each damper during each 1 millisecond cycle. If provided to a damper 20, each signal will attempt to cause a bypass valve actuation between open and closed positions whenever the signal changes its state. If the signal changes state on each consecutive cycle, this would cause the bypass valve to open and close at a frequency of 500 Hz. However, changes at frequencies greater than about 50 Hz produce no discernible suspension behavior benefit but tend to produce unnecessary bypass valve actuation, which might shorten its useful life. A simple method of filtering out the high frequency switching would be to sample the output at a lower rate, such as every fifth unfiltered damper signal, while ignoring all intermediate unfiltered damper signals. However, this method, as with all simple low pass filters, introduces a time delay (in this case, 5 milliseconds) to any commanded actuator action; and this delay is undesirable and unnecessary when the actuator has not changed its state for the previous 5 millisecond period.

Therefore, controller 15 applies a special filter routine to the binary unfiltered damper signals and thus generates filtered damper signals for output to dampers 20. This routine is described in the flow chart of FIG. 5 and the accompanying curves of FIGS. 6a and 6b. The routine uses a timer which may conveniently take the form of an initial integer count which is loaded into a register or RAM location in a reset operation and which is otherwise counted downward toward a reference count of zero by one each cycle in a manner well known and used by computer programmers. Since the computer cycles the program at a constant time rate, the method simulates a timer having a time period determined by the cycle rate and the initial count. Before reference to the flow chart, the routine may be defined briefly as follows:

(1) In each cycle, the count is checked. If it is zero, the filtered damper signal is changed to the same state as the unfiltered damper signal. If it is not zero, the filtered damper signal is unchanged.

(2) The count is reset to an initial count in any cycle in which the unfiltered damper signal changes state and is decremented toward zero in any cycle in which the unfiltered damper signal does not change state.

Figure 5:
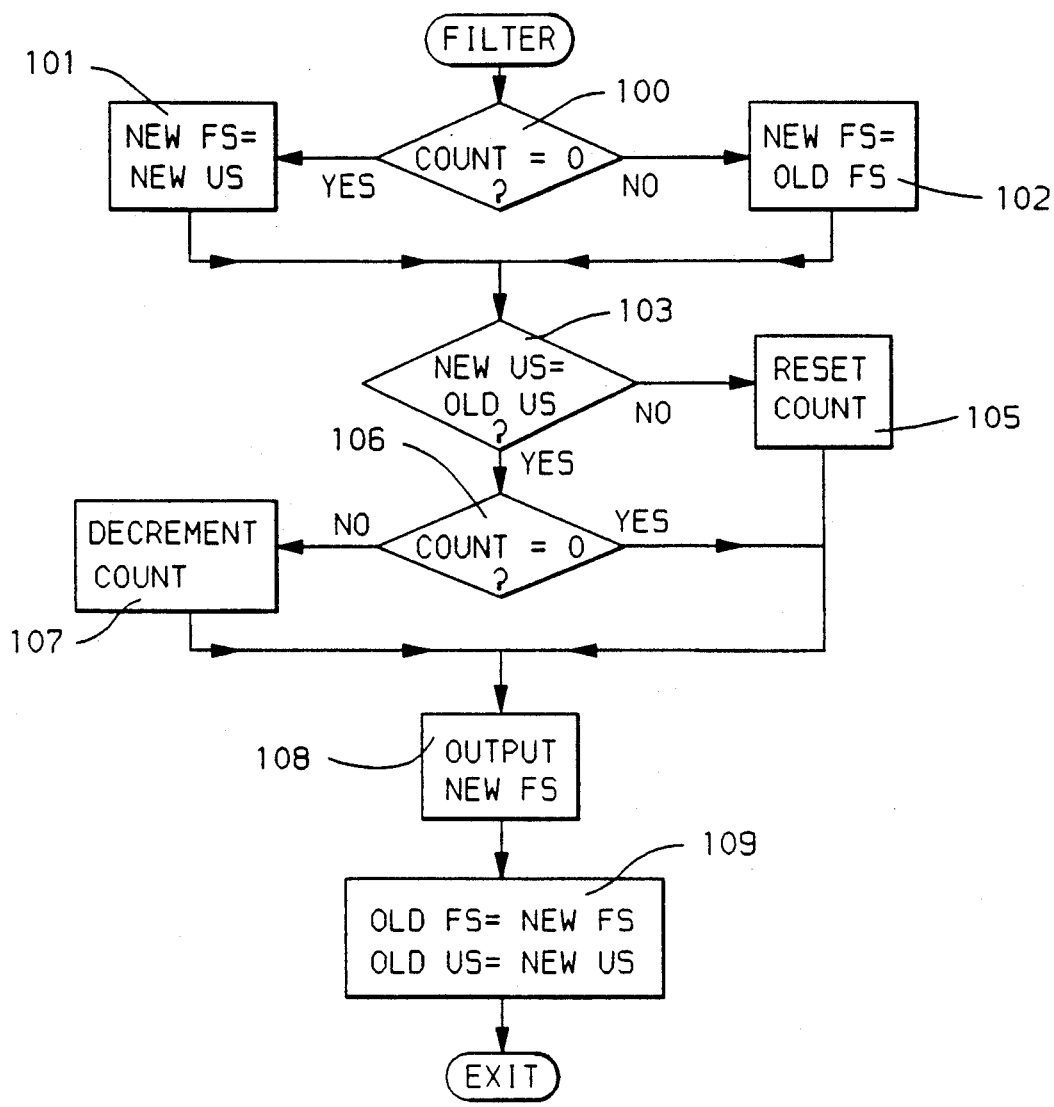
FIG. 5 is a flow chart illustrating the operation of the output filter portion of the suspension control for the vehicle of FIG. 1.
Figure 6:
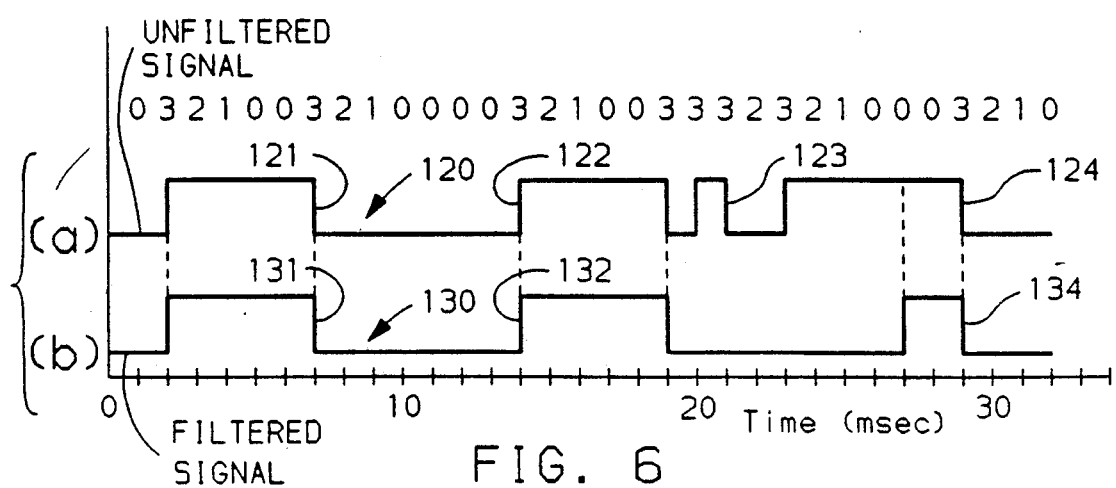
FIGS. 6a and 6b show timing diagrams giving examples of unfiltered and filtered damper signals useful in understanding the operation of the output filter portion of the suspension control for the vehicle of FIG. 1.

The operation of the filter routine may be understood with reference to the flow chart of FIG. 5 and the timing diagrams of FIGS. 6a and 6b. Referring to FIG. 5, the routine first determines (100) if the count holds a zero. If so, it sets (101) the new filtered damper signal NEW FS equal to the new unfiltered damper signal NEW US. However, if the count is anything other than zero, the routine sets (102) the new filtered damper signal NEW FS equal to the old filtered damper signal OLD FS. Next, the routine detects change in the unfiltered damper signal by determining (103) if the new unfiltered damper signal NEW US equals the old unfiltered damper signal OLD US. If they are not equal, there is a change in the unfiltered signal; and the count is reset (105) to a predetermined positive integer number such as 3. If they are equal, there is no change; and the count is decremented toward zero. This may be accomplished by checking (106) to see if the count is zero and decrementing the count (107) if it is not. Finally, the new filtered damper signal value NEW FS is output to the damper (108) and the new values of unfiltered and filtered damper signals replace the old values to prepare for the next cycle. The routine is then exited.

It can be seen that the filtered damper signal may be changed only when the unfiltered damper signal has been unchanged for a sufficiently long period: four cycles in this example. However, if the unfiltered damper signal has been unchanged for this period, the filtered damper signal may be changed immediately with a change in the unfiltered damper signal.

A sample unfiltered damper signal is shown in curve 120 of FIG. 6a; and its corresponding filtered damper signal produced by the apparatus of this invention is shown in curve 130 of FIG. 6b. The count at each one millisecond cycle of the control program is shown directly above curve 120 for an initial count of 3. The features of these curves can be described, for convenience, as positive-going pulses having variable durations. Pulses 121 and 122 of the unfiltered damper signal curve 120 generate similar pulses 131 and 132 in the filtered damper signal of curve 130, since they are longer in duration and in separation than the four millisecond counting time. However, pulse 123 of curve 120 is ignored entirely in the filtered damper signal, since it is only one millisecond in duration. In addition, pulse 134 of the filtered damper signal curve 130 is delayed and correspondingly shortened as compared with its corresponding unfiltered pulse 124 of curve 120, since pulse 124 followed pulse 123 too closely to allow the count to count down to zero. Pulse 134 of filtered curve 130 could therefore not begin until the count counted down to zero after its reset at the beginning of pulse 124 in unfiltered curve 120. The apparatus thus prevents passage of high frequency unfiltered damper signals such as shown in curve 120 from the end of pulse 122 through pulse 123 to the beginning of pulse 124; but, where the signals are low frequency, such as pulses 121 and 122, the apparatus passes the signals with essentially no delay. It will be noted that a longer, low frequency pulse having its initiation in a high frequency portion of the curve, such as pulse 124 of curve 120, will be delayed when passed by the apparatus, as seen in pulse 134 of curve 30. This is unavoidable, since its beginning is indistinguishable from the high frequency portion of the curve in which it is initiated; and it does not become apparent that it is a long duration pulse until the count counts down.

The embodiments of the invention in which an exclusive property or privilege is claimed are defined as follows:

1. A suspension control for a vehicle having a body and a road contacting wheel connected by a damper effective to apply a damping force therebetween, the damper including apparatus including a valve switchable in response to a binary filtered damper signal at frequencies within a desired activation frequency range between a first mode of operation characterized by a low damping force, in response to a first value of the filtered damper signal, and a second mode of operation having a high damping force, in response to a second value of the filtered damper signal, the suspension control comprising:

first means effective to repeatedly derive from one or more sensed vehicle suspension related operating variables, at a rate significantly greater than the desired activation frequency range, a binary unfiltered damper signal comprising a first value or a second value;

a timer active for a predetermined time after a reset and otherwise inactive; and filter apparatus effective to derive the filtered damper signal from each successive unfiltered damper signal by (1) resetting the timer each time the unfiltered damper signal changes value, (2) causing the filtered damper signal to be the same value as the unfiltered damper signal while the timer is inactive, and (3) maintaining the filtered damper signal value unchanged while the timer is active, whereby unnecessary high frequency switching of the valve is reduced but the damper responds without unnecessary delay to signals within the desired activation frequency range.

2. The suspension control of claim 1 in which the first means provides the first value of the unfiltered damper signal when a body/wheel force needed to provide a desired suspension behavior would require active power and the second value thereof at least some times when the body/wheel force needed to provide a desired suspension behavior would cause power to be dissipated.

3. A method for controlling a damper connected to provide a damping force between a body and a road contacting wheel of a vehicle, the damper comprising apparatus including a valve switchable in response to a binary filtered damper signal at frequencies within a desired activation frequency range between a first mode of operation characterized by a low damping force, in response to a first value of the filtered damper signal, and a second mode of operation having a high damping force, in response to a second value of the filtered damper signal, the method comprising the steps:

repeatedly deriving from one or more sensed vehicle suspension related operating variables, at a rate significantly greater than the desired activation frequency range, a binary unfiltered damper signal comprising a first value when a body/wheel force needed to provide a desired suspension behavior would require active power and a second value at least some times when the body/wheel force needed to provide a desired suspension behavior would cause power to be dissipated;

resetting a timer whenever the unfiltered damper signal changes value, the timer being active for a predetermined time after a reset and otherwise inactive;

for each derived unfiltered damper signal, providing the filtered damper signal with the same value as the unfiltered damper signal if the timer is inactive and with a value unchanged from the immediately preceding filtered damper signal if the timer is active, and applying the filtered damper signal to the damper to determine the damper mode of operation, whereby unnecessary high frequency switching of the valve is reduced but the damper responds without unnecessary delay to signals within the desired activation frequency range.

4. A method for controlling a damper connected to provide a damping force between a body and a road contacting wheel of a vehicle, the damper comprising apparatus including a valve switchable in response to a binary filtered damper signal at frequencies within a desired activation frequency range between a first mode of operation characterized by a low damping force, in response to a first value of the filtered damper signal, and a second mode of operation having a high damping force, in response to a second value of the filtered damper signal, the method being performed in a digital computing apparatus in a programmed cycle repeated at a rate significantly greater than the desired activation frequency range and comprising the steps, in each successive cycle:

deriving from one or more sensed vehicle suspension related operating variables a binary unfiltered damper signal comprising a first value when a body/wheel force needed to provide a desired suspension behavior would require active power and a second value at least some times when the body/wheel force needed to provide a desired suspension behavior would cause power to be dissipated;

providing the filtered damper signal with the same value as the unfiltered damper signal if a count has reached a reference count from an initial count or, alternatively, with a value unchanged from the filtered damper signal of the immediately preceding cycle if the count has not reached the reference count from the initial count;

comparing the unfiltered damper signal with an unfiltered damper signal generated during the immediately preceding cycle and resetting the count at the initial count if the unfiltered damper signal has changed value or, alternatively, incrementally changing the count toward the reference count if the unfiltered damper signal has not changed value;

directing the value of the filtered damper signal to the same value as the unfiltered damper signal if the count became equal to the reference count in the preceding step; and applying the filtered damper signal to the damper to determine the damper mode of operation.

* * * * *